US008185087B2

(12) United States Patent
Mitchell, Jr. et al.

(10) Patent No.: US 8,185,087 B2
(45) Date of Patent: May 22, 2012

(54) EMERGENCY 911 DATA MESSAGING

(75) Inventors: Donald L. Mitchell, Jr., Bellevue, WA (US); Yinjun Zhu, Sammamish, WA (US); Myron D'Souza, Seattle, WA (US); Roger S. Marshall, Auburn, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 443 days.

(21) Appl. No.: 12/232,417

(22) Filed: Sep. 17, 2008

(65) Prior Publication Data

US 2009/0227225 A1 Sep. 10, 2009

Related U.S. Application Data

(60) Provisional application No. 60/960,119, filed on Sep. 17, 2007.

(51) Int. Cl.
*H04M 11/04* (2006.01)

(52) U.S. Cl. ............... 455/404.1; 455/445; 455/466

(58) Field of Classification Search ........... 455/404.1, 455/550.1, 466, 414.4; 379/37–51; 340/287–309
See application file for complete search history.

(56) References Cited

U.S. PATENT DOCUMENTS

| 1,103,073 A | 7/1914 | O'Connell |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile et al. |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |

(Continued)

FOREIGN PATENT DOCUMENTS

WO  WO02/11407  2/2002

(Continued)

OTHER PUBLICATIONS

International Preliminary Report on Patentability in PCT/US2008/10828 dated May 6, 2010.

(Continued)

*Primary Examiner* — Kamran Afshar
*Assistant Examiner* — Dung Lam
(74) *Attorney, Agent, or Firm* — William H. Bollman

(57) ABSTRACT

A data request is generated (e.g., text, email, SMS, multimedia messaging system (MMS), etc.) from a source device. The data request is delivered to a PSAP or other emergency monitoring service location in a useable format. Exemplary useable formats include a canned voice message, delivery to a call center that translates data to voice, text to speech, and text to instant messaging (IM). Additional information and location are staged for use by the PSAP or other monitoring service location.

5 Claims, 3 Drawing Sheets

U.S. PATENT DOCUMENTS

| | | |
|---|---|---|
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLucca |
| 5,289,527 A | 2/1994 | Tiedemann, Jr. |
| 5,293,642 A | 3/1994 | Lo |
| 5,299,132 A | 3/1994 | Wortham |
| 5,311,516 A | 5/1994 | Kuznicki |
| 5,325,302 A | 6/1994 | Izidon |
| 5,327,529 A | 7/1994 | Fults et al. |
| 5,334,974 A | 8/1994 | Simms |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Caroll |
| 5,398,190 A | 3/1995 | Wortham |
| 5,406,614 A | 4/1995 | Hara |
| 5,418,537 A | 5/1995 | Bird |
| 5,423,076 A | 6/1995 | Westengren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway |
| 5,539,398 A | 7/1996 | Haall |
| 5,539,829 A | 7/1996 | Lokhoff et al. |
| 5,543,776 A | 8/1996 | L'Esperance |
| 5,552,772 A | 9/1996 | Janky |
| 5,555,286 A | 9/1996 | Tendler |
| 5,568,119 A | 10/1996 | Shippler |
| 5,574,648 A | 11/1996 | Pilley |
| 5,579,372 A | 11/1996 | Angstrom |
| 5,587,201 A | 12/1996 | Rho et al. |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,618 A | 2/1997 | Lokhoff et al. |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,755 A | 8/1997 | Van De Kerkhof et al. |
| 5,682,600 A | 10/1997 | Salin |
| 5,699,053 A | 12/1997 | Jonsson |
| 5,704,029 A | 12/1997 | Wright, Jr. |
| 5,712,900 A | 1/1998 | Maupin |
| 5,721,781 A | 2/1998 | Deo |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,809,415 A | 9/1998 | Rossman |
| 5,812,087 A | 9/1998 | Krasner |
| 5,822,700 A | 10/1998 | Hult |
| 5,828,740 A | 10/1998 | Khue |
| 5,841,396 A | 11/1998 | Kransner |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard et al. |
| 5,930,250 A | 7/1999 | Klok |
| 5,930,701 A | 7/1999 | Skog |
| 5,943,399 A | 8/1999 | Bannister |
| 5,945,944 A | 8/1999 | Kraser |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,960,362 A | 9/1999 | Grob |
| 5,974,054 A | 10/1999 | Couts |
| 5,978,685 A | 11/1999 | Lahai |
| 5,983,099 A | 11/1999 | Yao et al. |
| 5,987,323 A | 11/1999 | Houtari |
| 5,998,111 A | 12/1999 | Abe |
| 5,999,124 A | 12/1999 | Sheynblat |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,070,067 A | 5/2000 | Nguyen et al. |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,104,931 A | 8/2000 | Havinis |
| 6,122,503 A | 9/2000 | Daly |
| 6,122,520 A | 9/2000 | Want |
| 6,124,810 A | 9/2000 | Segal et al. |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos et al. |
| 6,148,197 A | 11/2000 | Bridges |
| 6,148,198 A | 11/2000 | Anderson |
| 6,149,353 A | 11/2000 | Nillson |
| 6,150,980 A | 11/2000 | Krasner |
| 6,169,891 B1 | 1/2001 | Gorham |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,185,427 B1 | 2/2001 | Krasner |
| 6,188,354 B1 | 2/2001 | Soliman et al. |
| 6,188,752 B1 | 2/2001 | Wesley |
| 6,188,909 B1 | 2/2001 | Alanara |
| 6,189,089 B1 | 2/2001 | Walker et al. |

| | | |
|---|---|---|
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,783 B1 | 6/2001 | Crone et al. |
| 6,253,074 B1 | 6/2001 | Carlsson |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,275,937 B1 | 8/2001 | Hailpern |
| 6,289,373 B1 | 9/2001 | DeZonno |
| 6,307,504 B1 | 10/2001 | Sheynblat |
| 6,308,269 B2 | 10/2001 | Proidl |
| 6,313,786 B1 | 11/2001 | Sheynblat et al. |
| 6,317,594 B1 | 11/2001 | Gossman |
| 6,321,091 B1 | 11/2001 | Holland |
| 6,321,250 B1 | 11/2001 | Knape |
| 6,321,257 B1 | 11/2001 | Kotola |
| 6,324,542 B1 | 11/2001 | Wright, Jr. |
| 6,327,473 B1 | 12/2001 | Soliman et al. |
| 6,327,479 B1 | 12/2001 | Mikkola |
| 6,333,919 B2 | 12/2001 | Gafney |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,433,734 B1 | 8/2002 | Krasner |
| 6,449,473 B1 | 9/2002 | Raivisto |
| 6,449,476 B1 | 9/2002 | Hutchison, IV |
| 6,456,852 B2 | 9/2002 | Bar |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,466 B2 | 2/2003 | Pande et al. |
| 6,522,682 B1 | 2/2003 | Kohli et al. |
| 6,529,490 B1 | 3/2003 | Oh |
| 6,529,722 B1 | 3/2003 | Heinrich |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Tekeda |
| 6,542,734 B1 | 4/2003 | Abrol et al. |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,534 B2 | 5/2003 | Abraham et al. |
| 6,570,530 B2 | 5/2003 | Gaal et al. |
| 6,571,095 B1 | 5/2003 | Koodli |
| 6,574,558 B2 | 6/2003 | Kohli |
| 6,584,307 B1 | 6/2003 | Antonucci |
| 6,584,552 B1 | 6/2003 | Nishimura |
| 6,594,500 B2 | 7/2003 | Bender et al. |
| 6,597,311 B2 | 7/2003 | Sheynblat et al. |
| 6,600,927 B2 | 7/2003 | Hamilton |
| 6,606,495 B1 | 8/2003 | Korpi et al. |
| 6,606,554 B2 | 8/2003 | Edge |
| 6,609,004 B1 | 8/2003 | Morse et al. |
| 6,611,757 B2 | 8/2003 | Brodie |
| 6,618,670 B1 | 9/2003 | Chansarkar |
| 6,621,452 B2 | 9/2003 | Knockeart et al. |
| 6,621,810 B1 | 9/2003 | Leung |
| 6,628,233 B2 | 9/2003 | Knockeart et al. |
| 6,630,093 B1 | 10/2003 | Jones |
| 6,633,255 B2 | 10/2003 | Krasner |
| 6,640,184 B1 | 10/2003 | Rabe |
| 6,650,901 B1 | 11/2003 | Schuster |
| 6,661,372 B1 | 12/2003 | Girerd |
| 6,665,539 B2 | 12/2003 | Sih et al. |
| 6,665,541 B1 | 12/2003 | Krasner et al. |
| 6,671,620 B1 | 12/2003 | Garin et al. |
| 6,677,894 B2 | 1/2004 | Sheynblat et al. |
| 6,678,357 B2 | 1/2004 | Stumer |
| 6,680,694 B1 | 1/2004 | Knockeart et al. |
| 6,680,695 B2 | 1/2004 | Turetzky et al. |
| 6,694,258 B2 | 2/2004 | Johnson et al. |
| 6,697,629 B1 | 2/2004 | Grilli et al. |
| 6,701,144 B2 | 3/2004 | Kirbas et al. |
| 6,703,971 B2 | 3/2004 | Pande et al. |
| 6,703,972 B2 | 3/2004 | van Diggelmen |
| 6,704,651 B2 | 3/2004 | van Diggelmen |
| 6,707,421 B1 | 3/2004 | Drury et al. |
| 6,714,793 B1 | 3/2004 | Carey et al. |
| 6,718,174 B2 | 4/2004 | Vayanos |
| 6,720,915 B2 | 4/2004 | Sheynblat |
| 6,721,578 B2 | 4/2004 | Minear et al. |
| 6,721,871 B2 | 4/2004 | Piispanen |
| 6,724,342 B2 | 4/2004 | Bloebaum et al. |
| 6,725,159 B2 | 4/2004 | Krasner |
| 6,731,940 B1 | 5/2004 | Nagendran |
| 6,734,821 B2 | 5/2004 | van Diggelen |
| 6,738,013 B2 | 5/2004 | Orler |
| 6,738,800 B1 | 5/2004 | Aquilon |
| 6,741,842 B2 | 5/2004 | Goldberg et al. |
| 6,744,856 B2 | 6/2004 | Karnik |
| 6,744,858 B1 | 6/2004 | Ryan |
| 6,745,038 B2 | 6/2004 | Callaway |
| 6,747,596 B2 | 6/2004 | Orler |
| 6,748,195 B1 | 6/2004 | Philips |
| 6,751,464 B1 | 6/2004 | Burg et al. |
| 6,756,938 B2 | 6/2004 | Zhao et al. |
| 6,757,544 B2 | 6/2004 | Rangarajan et al. |
| 6,771,742 B2 | 8/2004 | Mathis |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Groneneyer |
| 6,778,885 B2 | 8/2004 | Agashe et al. |
| 6,781,963 B2 | 8/2004 | Crockett |
| 6,788,249 B1 | 9/2004 | Farmer et al. |
| 6,795,699 B1 | 9/2004 | McCraw et al. |
| 6,799,049 B1 | 9/2004 | Zellner |
| 6,799,050 B1 | 9/2004 | Krasner |
| 6,801,159 B2 | 10/2004 | Swope et al. |
| 6,804,524 B1 | 10/2004 | Vandermeijjden |
| 6,808,534 B1 | 10/2004 | Escano |
| 6,810,323 B1 | 10/2004 | Bullock et al. |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong et al. |
| 6,820,069 B1 | 11/2004 | Kogan |
| 6,829,475 B1 | 12/2004 | Lee et al. |
| 6,832,373 B2 | 12/2004 | O'Neil |
| 6,839,020 B2 | 1/2005 | Geir et al. |
| 6,839,021 B2 | 1/2005 | Sheynblat et al. |
| 6,842,715 B1 | 1/2005 | Gaal |
| 6,853,916 B2 | 2/2005 | Fuchs et al. |
| 6,856,282 B2 | 2/2005 | Mauro et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor |
| 6,873,854 B2 | 3/2005 | Crockett |
| 6,885,940 B2 | 4/2005 | Brodie et al. |
| 6,888,497 B2 | 5/2005 | King et al. |

| | | |
|---|---|---|
| 6,888,932 B2 | 5/2005 | Snip |
| 6,895,238 B2 | 5/2005 | Nevell et al. |
| 6,895,249 B2 | 5/2005 | Gaal |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,395 B2 | 6/2005 | Berer et al. |
| 6,912,545 B1 | 6/2005 | Lundy |
| 6,915,208 B2 | 7/2005 | Garin et al. |
| 6,917,331 B2 | 7/2005 | Groneneyer |
| 6,925,504 B1 | 8/2005 | Liskov |
| 6,930,634 B2 | 8/2005 | Peng et al. |
| 6,937,187 B2 | 8/2005 | van Diggelen |
| 6,937,597 B1 | 8/2005 | Rosenburg |
| 6,937,872 B2 | 8/2005 | Krasner |
| 6,940,950 B2 | 9/2005 | Dickinson |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,073 B2 | 10/2005 | Bye |
| 6,961,019 B1 | 11/2005 | McConnell et al. |
| 6,961,562 B1 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,195 B2 | 11/2005 | Nowak |
| 6,970,917 B1 | 11/2005 | Kushwaha |
| 6,973,320 B2 | 12/2005 | Brown et al. |
| 6,975,266 B2 | 12/2005 | Abraham et al. |
| 6,978,453 B2 | 12/2005 | Rao |
| 6,980,816 B2 | 12/2005 | Rohles |
| 6,996,720 B1 | 2/2006 | DeMello |
| 6,999,782 B2 | 2/2006 | Shaughnessy |
| 7,020,480 B2 | 3/2006 | Coskun |
| 7,024,321 B1 | 4/2006 | Deninger et al. |
| 7,024,393 B1 | 4/2006 | Peinado |
| 7,047,411 B1 | 5/2006 | DeMello |
| 7,065,351 B2 | 6/2006 | Carter et al. |
| 7,065,507 B2 | 6/2006 | Mohammed |
| 7,079,857 B2 | 7/2006 | Maggenti |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rousseau |
| 7,136,838 B1 | 11/2006 | Peinado |
| 7,151,946 B2 | 12/2006 | Maggenti |
| 7,200,380 B2 | 4/2007 | Havlark |
| 7,209,969 B2 | 4/2007 | Lahti |
| 7,218,940 B2 | 5/2007 | Niemenmaa |
| 7,221,959 B2 | 5/2007 | Lindqvist |
| 7,246,187 B1 | 7/2007 | Ezra |
| 7,260,186 B2 | 8/2007 | Zhu |
| 7,321,773 B2 | 1/2008 | Hines |
| 7,366,157 B1 | 4/2008 | Valentine |
| 7,440,442 B2 | 10/2008 | Grabelsky |
| 7,516,198 B1 | 4/2009 | Appala |
| 7,522,581 B2 | 4/2009 | Acharya |
| 7,526,563 B2 | 4/2009 | Ingimundarson |
| 7,573,982 B2 | 8/2009 | Breen |
| 7,623,447 B1 | 11/2009 | Faccin |
| 7,627,331 B2 | 12/2009 | Winterbottom |
| 7,684,782 B2 | 3/2010 | Ashly |
| 7,702,081 B1 | 4/2010 | Klesper |
| 7,764,961 B2 | 7/2010 | Zhu et al. |
| 7,783,297 B2 | 8/2010 | Ishii |
| 7,895,263 B1* | 2/2011 | Kirchmeier et al. .......... 709/203 |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069259 A1 | 6/2002 | Kushwaha |
| 2002/0085538 A1 | 7/2002 | Leung |
| 2002/0086659 A1* | 7/2002 | Lauper .................. 455/404 |
| 2002/0099802 A1 | 7/2002 | Marsh |
| 2002/0102999 A1 | 8/2002 | Maggenti |
| 2002/0112047 A1 | 8/2002 | Kushwaha |
| 2002/0113797 A1 | 8/2002 | Potter |
| 2002/0141386 A1 | 10/2002 | Minert |
| 2002/0154221 A1 | 10/2002 | Ishimaru |
| 2002/0197991 A1 | 12/2002 | Anvekar |
| 2003/0009602 A1 | 1/2003 | Jacobs |
| 2003/0016804 A1 | 1/2003 | Sheha |
| 2003/0037163 A1 | 2/2003 | Kitada et al. |
| 2003/0065788 A1 | 4/2003 | Salomaki |
| 2003/0072318 A1 | 4/2003 | Lam |
| 2003/0078064 A1 | 4/2003 | Chan |
| 2003/0078886 A1 | 4/2003 | Minear |
| 2003/0081557 A1 | 5/2003 | Mettala |
| 2003/0081752 A1 | 5/2003 | Trandal |
| 2003/0086539 A1 | 5/2003 | McCalmont |
| 2003/0101329 A1 | 5/2003 | Lahti |
| 2003/0103484 A1 | 6/2003 | Oommen |
| 2003/0114148 A1 | 6/2003 | Albertson |
| 2003/0115328 A1 | 6/2003 | Saliminen |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1* | 10/2003 | Rhodes et al. ............ 455/456.1 |
| 2003/0196105 A1 | 10/2003 | Fineberg |
| 2003/0204640 A1 | 10/2003 | Sahinoja |
| 2003/0222901 A1 | 12/2003 | Houck |
| 2003/0223381 A1 | 12/2003 | Schrodens |
| 2004/0002326 A1 | 1/2004 | Maher |
| 2004/0044623 A1 | 3/2004 | Wake |
| 2004/0068724 A1 | 4/2004 | Gardner |
| 2004/0093217 A1 | 5/2004 | Yeh |
| 2004/0098497 A1 | 5/2004 | Banet |
| 2004/0107143 A1 | 6/2004 | Niemi |
| 2004/0132465 A1 | 7/2004 | Mattila |
| 2004/0146040 A1 | 7/2004 | Phan-Anh |
| 2004/0156394 A1 | 8/2004 | Westman |
| 2004/0157175 A1 | 8/2004 | Matsumoto |
| 2004/0163104 A1 | 8/2004 | Warden |
| 2004/0176123 A1 | 9/2004 | Chin |
| 2004/0184584 A1 | 9/2004 | McCalmont |
| 2004/0205151 A1 | 10/2004 | Sprigg |
| 2004/0215687 A1 | 10/2004 | Klemba |
| 2004/0225740 A1 | 11/2004 | Klemba |
| 2004/0229632 A1 | 11/2004 | Flynn |
| 2004/0242238 A1 | 12/2004 | Wang |
| 2004/0267445 A1 | 12/2004 | De Luca |
| 2005/0028034 A1 | 2/2005 | Gantman |
| 2005/0031095 A1* | 2/2005 | Pietrowicz ................. 379/88.18 |
| 2005/0039178 A1 | 2/2005 | Marolia |
| 2005/0041578 A1 | 2/2005 | Huotari |
| 2005/0043037 A1 | 2/2005 | Loppe |
| 2005/0047399 A1 | 3/2005 | Lee et al. |
| 2005/0053209 A1 | 3/2005 | D'Evelyn |
| 2005/0086467 A1 | 4/2005 | Asokan |
| 2005/0119012 A1 | 6/2005 | Merheb |
| 2005/0135569 A1 | 6/2005 | Dickinson |
| 2005/0153706 A1 | 7/2005 | Niemenmaa |
| 2005/0169248 A1 | 8/2005 | Truesdale |
| 2005/0190892 A1 | 9/2005 | Dawson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0259675 A1 | 11/2005 | Tuohino et al. |
| 2005/0282518 A1 | 12/2005 | D'Evelyn |
| 2005/0287979 A1 | 12/2005 | Rollender |
| 2006/0044407 A1 | 3/2006 | Barbeau |
| 2006/0053225 A1 | 3/2006 | Poikselka |
| 2006/0079236 A1 | 4/2006 | Del Pino |
| 2006/0099935 A1 | 5/2006 | Gallagher |
| 2006/0128395 A1 | 6/2006 | Muhonen |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0205383 A1 | 9/2006 | Rollender |
| 2006/0212558 A1 | 9/2006 | Sahinoja |
| 2006/0212562 A1 | 9/2006 | Kushwaha |

| | | |
|---|---|---|
| 2006/0234639 A1 | 10/2006 | Kushwaha |
| 2006/0234698 A1 | 10/2006 | Folk |
| 2006/0239205 A1 | 10/2006 | Warren |
| 2006/0258380 A1 | 11/2006 | Liebowitz |
| 2006/0293066 A1 | 12/2006 | Edge |
| 2007/0004429 A1 | 1/2007 | Edge |
| 2007/0010248 A1 | 1/2007 | Dravida |
| 2007/0021098 A1 | 1/2007 | Rhodes |
| 2007/0026854 A1 | 2/2007 | Nash |
| 2007/0026871 A1 | 2/2007 | Wager |
| 2007/0027997 A1 | 2/2007 | Polk |
| 2007/0030539 A1 | 2/2007 | Nath |
| 2007/0041513 A1 | 2/2007 | Gende |
| 2007/0049288 A1 | 3/2007 | Lamprecht |
| 2007/0060097 A1 | 3/2007 | Edge |
| 2007/0104183 A1 | 5/2007 | Bakke |
| 2007/0117574 A1 | 5/2007 | Watanabe |
| 2007/0117577 A1 | 5/2007 | Harris |
| 2007/0135089 A1 | 6/2007 | Edge |
| 2007/0149213 A1 | 6/2007 | Lamba |
| 2007/0160036 A1 | 7/2007 | Smith |
| 2007/0190968 A1 | 8/2007 | Dickinson |
| 2007/0218871 A1 | 9/2007 | Bonner |
| 2007/0238448 A1 | 10/2007 | Gallagher |
| 2007/0253429 A1 | 11/2007 | James |
| 2007/0254625 A1 | 11/2007 | Edge |
| 2008/0045250 A1 * | 2/2008 | Hwang ............... 455/466 |
| 2008/0137624 A1 | 6/2008 | Silverstrim |
| 2008/0162637 A1 | 7/2008 | Adamczyk |
| 2008/0268809 A1 | 10/2008 | Busin |
| 2009/0003535 A1 | 1/2009 | Grabelsky |
| 2009/0067417 A1 | 3/2009 | Kalavade |
| 2009/0097450 A1 | 4/2009 | Wallis |
| 2009/0128404 A1 | 5/2009 | Martino |
| 2009/0221263 A1 | 9/2009 | Titus |
| 2010/0076767 A1 | 3/2010 | Vieri |

FOREIGN PATENT DOCUMENTS

WO    WO/2004021726    3/2004

OTHER PUBLICATIONS 47 code of federal regulations (Oct. 1, 2005 Edition).
European Search Report in Appl. No. EP07 71 6216 dated Dec. 12, 2009.
Zehua et al., "On Querying Geospatial and Georeferenced Metadata Resources in G-Portal," IEEE Comp. SOC, May 31, 2003, pp. 245-255.
Peterson et al., "A Presence-Based GEOPRIV Location Object Format; rfc4119,txt," Neustar, Dec. 1, 2005, pp. 1-23.
Winterbottom, et al., "GEOPRIV PID-Lo Usage Clarification, Considerations and Recommendations; draft-ietf-geopriv-pdif-lo-profile-00.txt," Nortel, Jul. 2, 2005, pp. 1-31.
Berners-Lee, et al., "Uniform Resource Identifier (URI) Generic Standard, Internet Engineering Task Force," Day Software, Jan. 1, 2005, pp. 1-61.
U.S. Appl. No. 09/539,495, filed Mar. 2000, Abrol.
Schulzrinne et al., Emergency Services for Internet Telephony Systems draft-schulzrinne-sipping-emergency-arch, IETF Standard Working Draft, Feb. 4, 2004, 1-22.
International Search Report PCT/US2008/10828 dated Nov. 21, 2008.

* cited by examiner

EMERGENCY 911 DATA MESSAGING

This application claims priority from U.S. Provisional Application No. 60/960,119, to Mitchell, Jr., et al., entitled "Routing SMS Messages Upon Location in a CDMA Network For Emergency Services", filed Sep. 17, 2007, the entirety of which is expressly incorporated herein by reference.

BACKGROUND OF THE INVENTION

1. Field of the Invention

This invention relates generally to telecommunications. More particularly, it relates to wireless messaging and wireless emergency services such as E911.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate public service access point (PSAP), based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without the caller's actual callback number or location information displayed at the emergency operator's terminal.

The result of an E911 call is a direct circuit connection between the requestor and the responder. 911 is further enhanced with the ability to deliver location information over a data channel in parallel to the emergency call. This data is typically staged in a database that is queried by the PSAP to determine location information.

FIG. 3 depicts an overview of conventional enhanced 9-1-1 (E9-1-1) voice call flow in currently deployed architecture.

In particular, as shown in FIG. 3, an emergency voice call is initiated at a mobile station or handset 102, delivered through a relevant radio tower and base station 104 to a Mobile Switching Center (MSC) 206. The emergency voice call is then held while call setup information is delivered to a location center 222. The location center 222 responds to the MSC 206 with appropriate call routing information, and triggers a request for precise location. The MSC 206 releases the call and routes it to the correct PSAP through a selective router 210 based on information provided from the location center 222. The location center 222 then stages a record in an automatic location information (ALI) database 214. When the precise location information is returned to the location center 222 from a position determining entity 226, this location coordinate information is compared to a coordinate routing database 224, and the matching address and call back information is then staged for retrieval by the ALI database 214.

The current 911 infrastructure was designed to route a voice emergency call to the local PSAP. Unfortunately, this requires that voice circuits be available to carry the emergency call. During times of regional crises, such as a hurricane, the local wireless infrastructure can become overloaded by call volume. This was experienced during the September 11th terrorist attacks during which voice telecommunications along the East Coast was subject to service failures.

SUMMARY OF THE INVENTION

In accordance with the principles of the present invention, an emergency system short messaging system (SMS) location proxy comprises an interface between the SMS location proxy and a short messaging service center (SMSC), and an interface to an emergency services provider. A module provides location information relating to an emergency services data message routed via the SMSC and directed toward the emergency services provider.

In accordance with another embodiment of the present invention, apparatus for providing 911 equivalent data emergency services comprises a short messaging system (SMS) location proxy to provide location information relating to an emergency data message. A module receives a request for location of a data message, and a module provides requested location of a data message to an emergency services provider. In this way, data emergency services are provided using a non-persistent connection with an emergency data initiator.

In accordance with yet another embodiment of the present invention, 911 equivalent data emergency services are provided to an emergency data initiator using a non-persistent connection by associating a request for location relating to a non-persistent emergency data message with a geo-location. The request for location is delivered to an appropriate emergency services provider in a format useable by the emergency services provider. Location information is staged for use by the emergency services provider.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Short message system (SMS) technology is available to generate SMS traffic from a handset and deliver the message to another handset or to an Internet Address. There is also a wireline SMS capability that has been introduced to deliver an SMS message to non-SMS enabled devices. But SMS is not a persistent connection, and there is no conventional location capability associated with SMS. Moreover, conventional technologies do not have the capability to deliver SMS messages to a PSAP.

Public service answering point (PSAP) connectivity to the public switched telephone network (PSTN) is managed through dedicated switches called emergency services gateways (ESGW) that conventionally can not be directly dialed and do not support SMS traffic. Even if the switches were able to support the delivery of SMS to the PSAP, there is no currently available method for the PSAP to process and display or use the information from an SMS.

The inventors of the present invention have empirically recognized that during times of voice circuit overload, the signaling system No. 7 (SS7) signaling network had excess capacity available to carry short message traffic. The present invention enables a Short Message Service (SMS) capability for generating an emergency 911 "equivalent" call. This capability enables SMS savvy consumers to generate requests for assistance to the local Public Safety Answering Point (PSAP) that can be understood and translated to provide first responders with the information they need to offer timely assistance.

This invention offers a solution architecture and method for delivery of 911 equivalent requests for emergency assistance using non-voice centric, and importantly non-persistent connectivity sources such as SMS, email, and autonomous data/message generation devices.

According to the principles of the present invention, a data request is generated (e.g., text, email, SMS, multimedia messaging system (MMS), etc.) from a source device. The data request is delivered to a PSAP or other emergency monitoring service location in a useable format. Exemplary useable formats include a canned voice message, delivery to a call center that translates data to voice, text to speech, and text to instant messaging (IM). Additional information and location are staged for use by the PSAP or other monitoring service location.

An overview of the invention for data 911 is now described. While some similarities to conventional voice based persistent circuit technologies exist, the inventive data 911 call flow is broken down into more detail in subsequent sections to specifically delineate significant differences and uniqueness of the invention.

Figure 1:
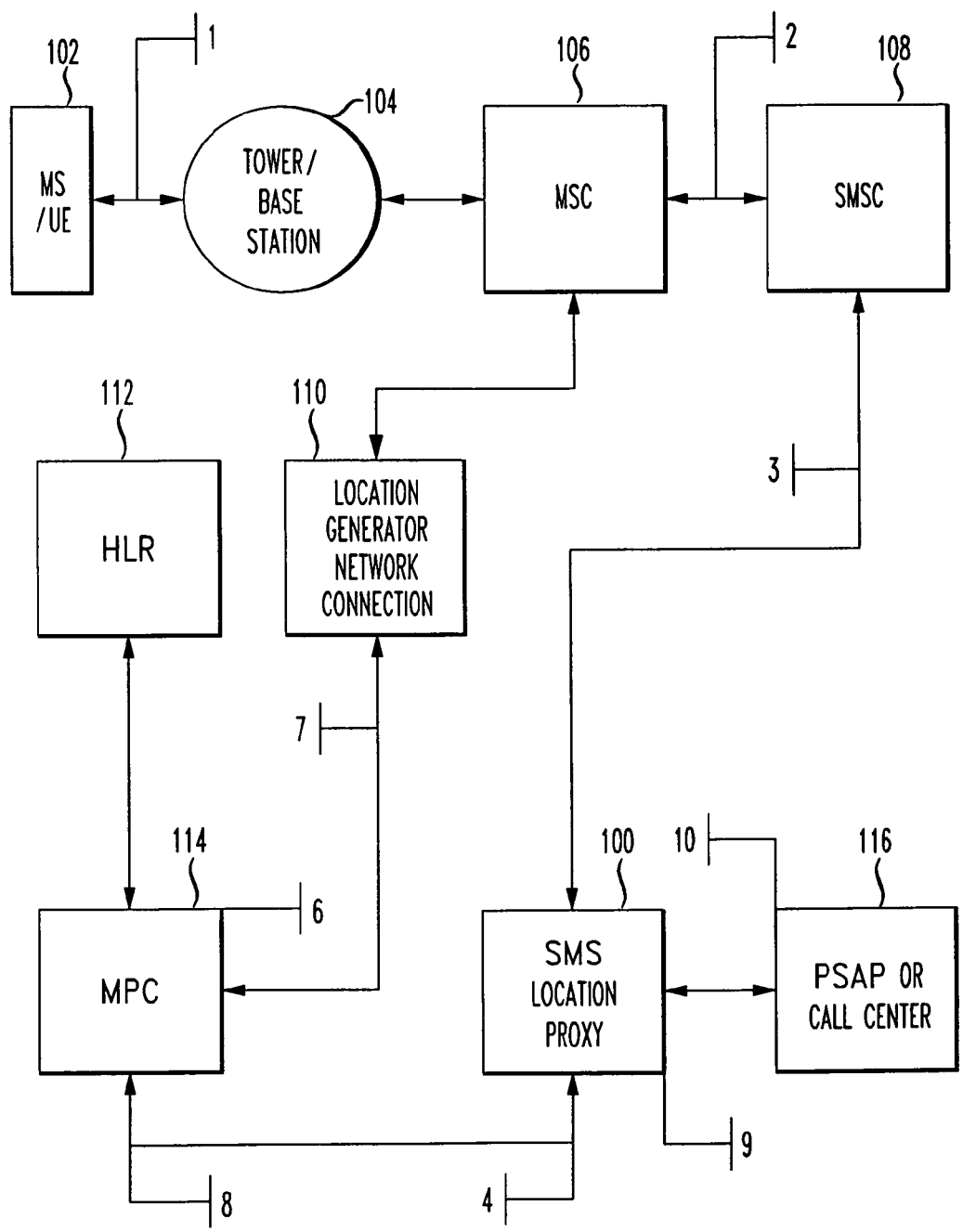
FIG. 1 depicts an exemplary embodiment for generating an E9-1-1 text message with geographic location information for delivery to a PSAP, in accordance with the principles of the present invention.

FIG. 1 depicts an exemplary embodiment for generating an E9-1-1 text message with geographic location information for delivery to a PSAP, in accordance with the principles of the present invention.

In particular, as shown in FIG. 1, an example of the invention based on use of Short Message technology is presented. In this example, the source of the emergency data message is a handset type of device 102 also capable of making a voice call. However, while the handset device 102 sends a text message addressed by the user/caller simply as 911 instead of dialing a phone number.

In call flow, the 911 emergency text message from the mobile station/user equipment (MS/UE), or handset, 102 traverses the radio network and the base station controller 104, and then is delivered to the mobile switching center (MSC) 106. The MSC 106 routes the 911 emergency text message to an SMS platform (SMSC) 108.

In step 1 of FIG. 1, a user on a handset 102 sends an emergency data message (e.g., text) via their servicing Short-Message-Service (SMS) network addressed simply to "911" or other designated Emergency Services Identity. In the given example, the source of the emergency data message has a preferable form of MSISDN@carrierdomain.com, though any appropriate unique address scheme unique to the handset 102 or specific user is possible.

In step 2, the exemplary emergency SMS data message (e.g., "Help me!") is routed from the MSC 106 to the relevant SMSC 108.

In step 3, the SMSC 108 routes the exemplary emergency SMS data message to the SMS location proxy 100.

In step 4, the SMS location proxy 100 initiates a request for routing to the MPC 114. The emergency SMS data message originating MSISDN and the identity of the carrier is sent to a mobile positioning center (MPC) 114 with the request for routing.

In step 5, the MPC 114 receives the request for routing, and then requests information from the network using the current method to derive the remaining information necessary to request location from the network.

In step 6, the MPC 114 then requests information about the precise latitude/longitude (lat/lon) and/or rough position (tower/sector) of the emergency texter. The request for routing preferably includes an indicator of "Emergency Services" or similar designation.

In step 7, the network calculates the position of the emergency texter and returns this information to the MPC 114.

In step 8, the MPC 114 uses the "rough" location information (or optionally: the precise) to determine the routing necessary for the emergency SMS data message, and returns a route destination to the SMS location proxy 100.

In step 9, the SMS location proxy 100 routes the emergency SMS data message (+appended Location Information—Rough and Precise (when available) to the appropriate PSAP or call center 116.

In step 10, the emergency texting user or emergency text message initiator is messaged that their emergency SMS data message has been received. An instant messaging (IM)-like non-persistent connection is made between the PSAP or call center 116 and the emergency texting user or emergency text message initiator through the SMS location proxy 100.

Figure 2:
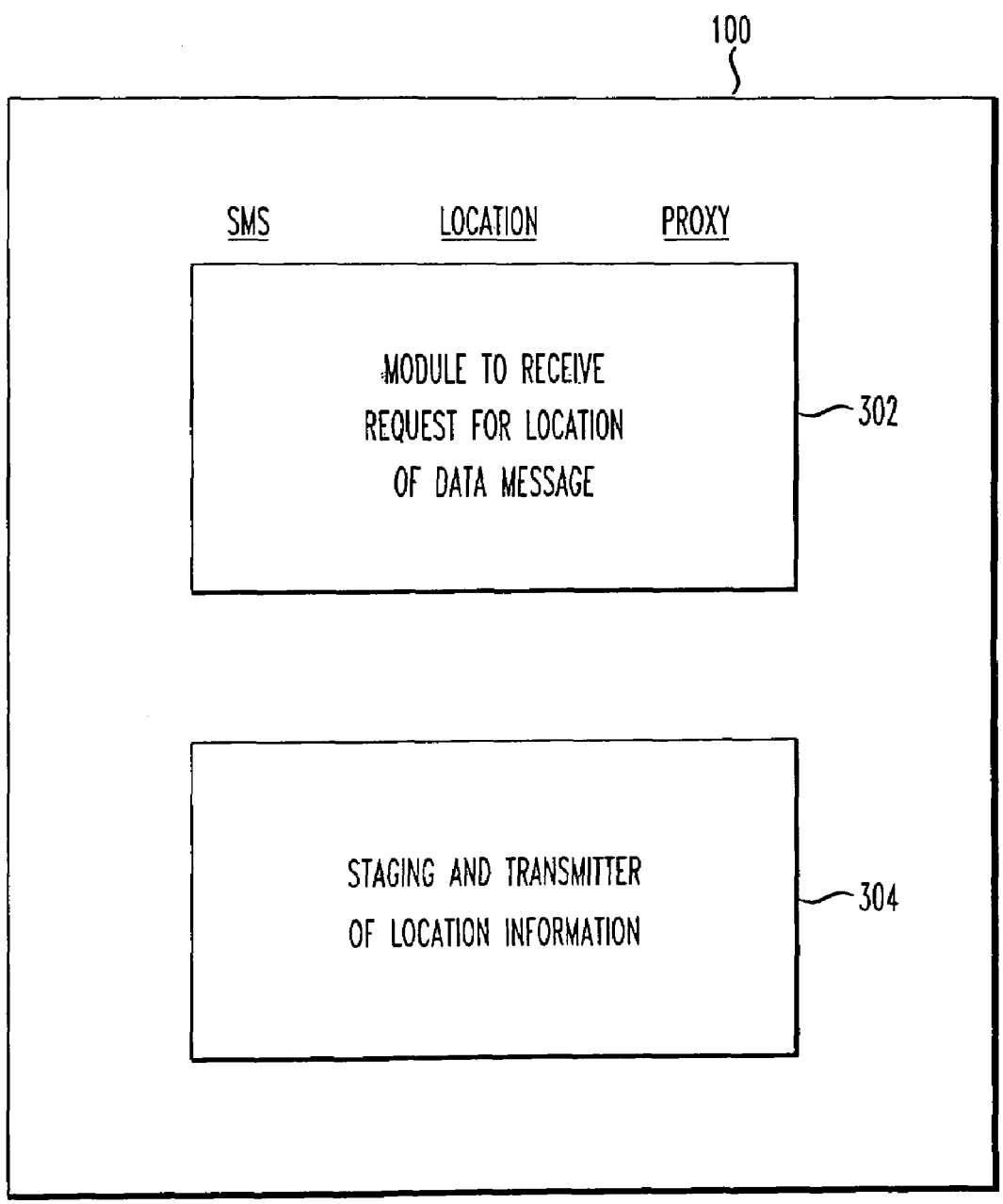
FIG. 2 shows relevant elements of an SMS location proxy in more detail, in accordance with the principles of the present invention.
Figure 3:
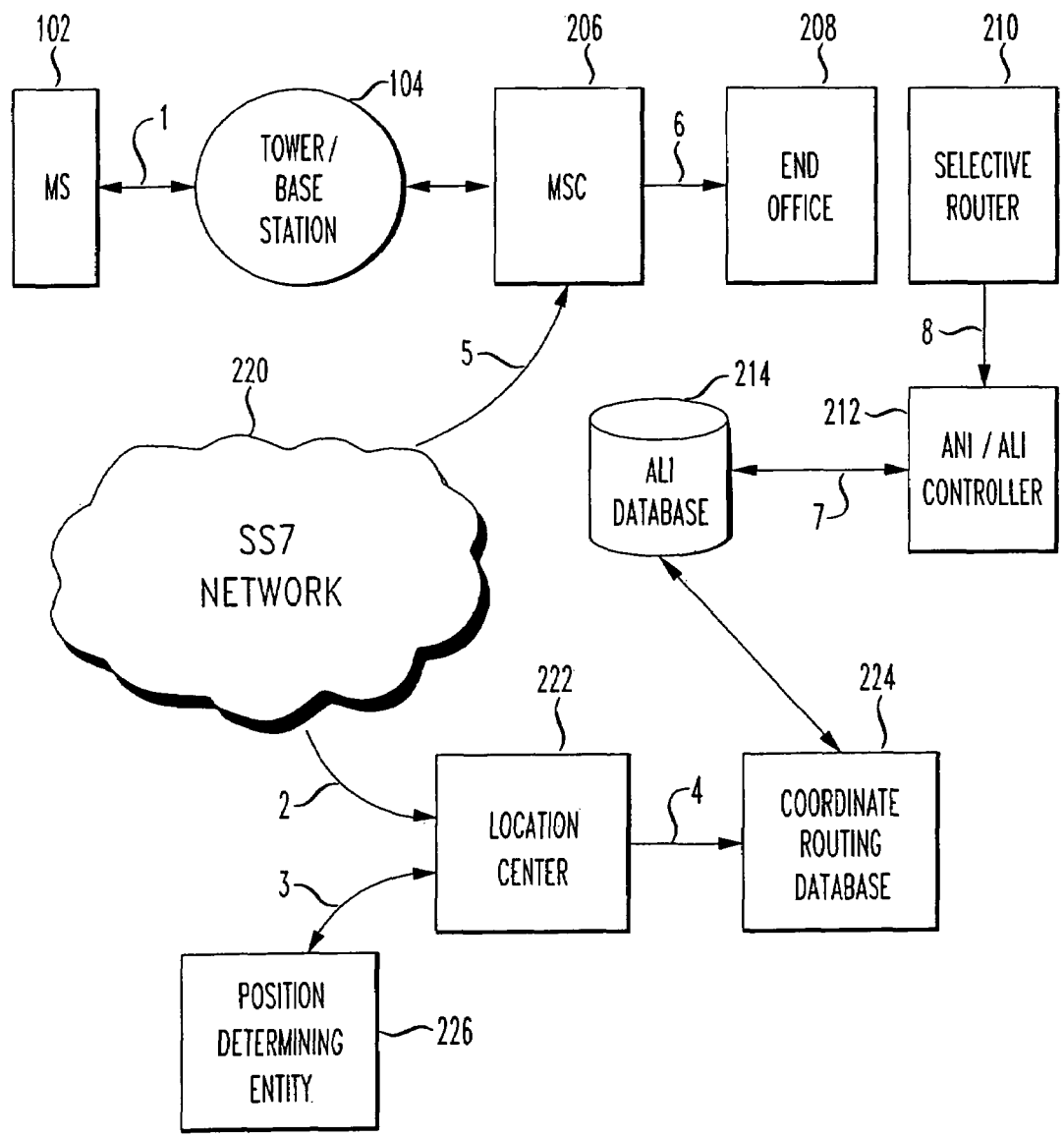
FIG. 3 depicts an overview of conventional enhanced 9-1-1 (E9-1-1) voice call flow in currently deployed architecture.

FIG. 2 shows relevant elements of an SMS location proxy in more detail, in accordance with the principles of the present invention.

In particular, as shown in FIG. 2, the exemplary SMS location proxy 100 includes an application module loaded into an appropriate gateway element to receive requests for location of a data message. The exemplary SMS location proxy 100 also includes an application module that stages the relevant location information relating to the location of emergency data messages (e.g., emergency 911 text messages) and transmits that location information (e.g., lat/long information and/or street address information) to an appropriate emergency services provider such as a PSAP or call center 116 (FIG. 1).

While initially envisioned as a method for supporting SMS initiated emergency 911 text messages, the present invention can also be used for delivery of other types of non-voice initiated sources using non-persistent communications, such as in-vehicle monitoring systems, autonomous monitoring devices for dams/levies, health monitoring equipment, electronic mail, etc. However, in the given example the emergency texting device must be CDMA capable.

This invention enables PSAPs to receive, process, and act upon a wide variety of non-voice messaging information such as a simple text message to complex image messaging (e.g., MMS).

The present invention can be extended for use to enable automated systems to provide text message warnings or notifications to operator monitored services that have a specific geographic regional coverage.

The invention has particular applicability to the wireless E9-1-1 market, including to any US CDMA carrier, and to virtually any company which markets devices with CDMA connectivity.

The present invention permits a method for routing an emergency SMS data message based upon the general or precise location of an emergency texting sender's data messaging device.

While the invention has been described with reference to the exemplary embodiments thereof, those skilled in the art will be able to make various modifications to the described embodiments of the invention without departing from the true spirit and scope of the invention.

What is claimed is:

1. A method of providing 911 equivalent data emergency services to an emergency data initiator using a non-persistent connection, comprising:
    associating a request for location, relating to a non-persistent emergency data message, with a geo-location;
    modifying a format of said non-persistent emergency data message to formulate an emergency services provider formatted non-persistent emergency data message;
    routing, toward an appropriate emergency services provider, said emergency services provider formatted non-persistent emergency data message; and
    staging location information, for said emergency services provider format modified non-persistent emergency data message, for use by said appropriate emergency services provider.

2. The method of providing 911 equivalent data emergency services to an emergency data initiator using a non-persistent connection according to claim 1, wherein said useable format comprises:
    a canned voice message.

3. The method of providing 911 equivalent data emergency services to an emergency data initiator using a non-persistent connection according to claim 1, wherein said useable format comprises:
    translation of said data message to voice.

4. The method of providing 911 equivalent data emergency services to an emergency data initiator using a non-persistent connection according to claim 1, wherein said useable format comprises:
    translation of said data message to an instant message (IM).

5. The method of providing 911 equivalent data emergency services to an emergency data initiator using a non-persistent connection according to claim 1, wherein said useable format comprises:
    translation of said data message to an email.

* * * * *